(12) United States Patent
Lutz et al.

(10) Patent No.: US 7,691,001 B2
(45) Date of Patent: Apr. 6, 2010

(54) METHOD FOR PRODUCING A JOINT CONNECTION AND JOINT CONNECTION

(75) Inventors: Mathias Lutz, Tuebingen (DE); Werner Jacob, Frankfurt am Main (DE); Manfred Niederhuefner, Hanau (DE)

(73) Assignees: Shaft-Form-Engineering GmbH, Muehlheim (DE), part interest; BF New Technologies GmbH, Ennepetal (DE), part interest ( * ) Notice: Subject to any disclaimer, the term of this patent is extended or adjusted under 35 U.S.C. 154(b) by 0 days.

(21) Appl. No.: 11/855,828

(22) Filed: Sep. 14, 2007

(65) Prior Publication Data

US 2008/0104844 A1 May 8, 2008

Related U.S. Application Data

(63) Continuation of application No. PCT/EP2006/001846, filed on Feb. 28, 2006.

(30) Foreign Application Priority Data

Mar. 15, 2005 (DE) ........................ 10 2005 012 178

(51) Int. Cl.
*F16D 1/076* (2006.01)
(52) U.S. Cl. ........................ 464/182; 464/906; 403/364
(58) Field of Classification Search ......... 464/140–146, 464/149, 157, 178, 182, 906; 403/364
See application file for complete search history.

(56) References Cited

U.S. PATENT DOCUMENTS

| | | | |
|---|---|---|---|
| 1,660,792 A * | 2/1928 | Hirth | |
| 2,266,283 A | 12/1941 | Spengler | |
| 4,460,058 A * | 7/1984 | Welschof et al. | 464/182 X |
| 4,893,960 A | 1/1990 | Beier et al. | |
| 5,797,801 A | 8/1998 | Jacob | |
| 6,276,180 B1 | 8/2001 | Hirschvogel et al. | |
| 6,413,008 B1 | 7/2002 | van Dest et al. | |
| 6,669,570 B2 | 12/2003 | Krude | |
| 6,780,114 B2 * | 8/2004 | Sahashi et al. | 464/146 |
| 7,007,536 B2 | 3/2006 | Nakai | |

(Continued)

FOREIGN PATENT DOCUMENTS

AT 102431 * 1/1926 .................. 464/141

(Continued)

OTHER PUBLICATIONS

Universal Joint and Driveshaft Design Manual, AE-7, Society of Automotive Engineers, Inc., Warrendale, PA, p. 10, TJ1079.S62 1979.*

(Continued)

*Primary Examiner*—Greg Binda
(74) *Attorney, Agent, or Firm*—Crowell & Moring LLP

(57) ABSTRACT

A method for producing a joint connection for torque-transmitting connection of a component (1) provided with spur gear teeth (13) with a constant velocity joint (2) provided with corresponding spur gear teeth (11). The spur gear teeth can be brought into interengagement by applying an axial engaging force and have flanks (25) that contact each other as functional surfaces. The invention also relates to a joint connection of the aforementioned type.

5 Claims, 2 Drawing Sheets

U.S. PATENT DOCUMENTS

| | | | |
|---|---|---|---|
| 7,040,992 B2 * | 5/2006 | Dine et al. | 464/145 X |
| 2003/0050122 A1 | 3/2003 | Yorston et al. | |
| 2005/0153782 A1 | 7/2005 | Jacob et al. | |

FOREIGN PATENT DOCUMENTS

| | | | |
|---|---|---|---|
| CA | 511529 * | 4/1955 | 464/157 |
| DE | 72 17 122 | 7/1974 | |
| DE | 31 16 720 C1 | 10/1982 | |
| DE | 36 36 243 A1 | 5/1988 | |
| DE | 43 10 008 A1 | 9/1994 | |
| DE | 43 10 007 C1 | 10/1994 | |
| DE | 44 41 629 C1 | 3/1996 | |
| DE | 197 51 855 C1 | 4/1999 | |
| DE | 198 09 039 A1 | 9/1999 | |
| DE | 199 58 674 A1 | 6/2001 | |
| DE | 101 27 458 A1 | 1/2003 | |
| DE | 102 09 933 A1 | 10/2003 | |
| EP | 1 389 694 A1 | 2/2004 | |
| JP | 8200384 (A) | 8/1996 | |
| RU | 778398 (A1) | 11/1992 | |
| RU | 1814962 | 5/1993 | |
| RU | 2 011 498 (C1) | 4/1994 | |
| SU | 1748912 | 7/1992 | |

OTHER PUBLICATIONS

International Search Report dated May 31, 2006 including English translation of pertinent portion (Six (6) pages).

* cited by examiner

METHOD FOR PRODUCING A JOINT CONNECTION AND JOINT CONNECTION

CROSS REFERENCE TO RELATED APPLICATIONS

This application is a continuation of international patent application no. PCT/EP2006/001846, filed Feb. 28, 2006 designating the United States of America and published in German on Sep. 21, 2006 as WO 2006/097194, the entire disclosure of which is incorporated herein by reference. Priority is claimed based on Federal Republic of Germany patent application no. DE 10 2005 012 178.0, filed Mar. 15, 2005.

BACKGROUND OF THE INVENTION

The present invention relates to a method for producing a joint connection for the torque-transmitting connection of a component provided with spur gear teeth with a constant velocity joint provided with corresponding spur gear teeth, such that the spur gear teeth can be brought into interengagement by means for applying an axial bias and have flanks that contact each other as functional surfaces. The invention also relates to such a joint connection.

Flange connections for connecting a joint in a torque-transmitting and releasable manner to any other component, such as a shaft, are known in the art, but they require too much space for some applications.

Also known in the art is the insertion of a spline shaft into a correspondingly contoured bore of the joint to produce a torque transmitting connection. However, this connection requires a comparatively large axial assembly displacement path.

Beier et al., U.S. Pat. No. 4,893,960 (=DE 36 36 243), and published German application nos. DE 43 10 007 and DE 43 10 008 therefore propose joint connections where the outer hub of a joint is provided with spur gear teeth engageable for torque transmission with corresponding spur gear teeth on another component.

Van Dest et al., U.S. Pat. No. 6,413,008 (=DE 197 51 855), published German application no. DE 199 58 674 and Krude, U.S. Pat. No. 6,669,570 (=DE 101 27 458) further describe a connection assembly where the outer hub of a joint can be coupled to a connecting element by spur gear teeth. These spur gear teeth may to a large extent be produced in a non-cutting or chipless forming process. The production of these spur gear teeth could be improved, however, with respect to both the manufacturing costs and the manufacturing accuracy of the spur gear teeth.

SUMMARY OF THE INVENTION

It is therefore an object of the invention to provide an improved method for producing a joint connection for the torque-transmitting connection of a component provided with spur gear teeth to a constant velocity joint provided with corresponding spur gear teeth.

Another object of the invention is to provide a corresponding joint connection that is characterized by high manufacturing precision and at the same time by low manufacturing costs.

According to the invention, this object is essentially achieved by pre-forming the spur gear teeth in one or more process step(s) and then finishing only the functional surfaces to final dimensions. For example, the spur gear teeth are preformed by hot forming or warm forming and only the functional surfaces are subsequently finished to their final dimensions by stamping or coining.

It is preferred if at least in the last non-cutting or chipless process step only the functional surfaces are stamped to cause material displacement. Compared to chipless processing of the entire set of spur gear teeth where bearing pressure is created and high deformation forces are consequently necessary, the required deformation can be accomplished by displacement at comparatively low energy cost by processing only the functional surfaces. By stamping the functional surfaces they can be finished to their final dimensions with very high, reproducible accuracy.

In a preferred embodiment of the method according to the invention, the functional surfaces increase to their final dimensions in the chipless finishing process. It may be advantageous in the preforming process to form the tooth shape of the spur gear teeth in such a way as to ensure, in the step of chipless finishing to the final dimensions, a free flow of material on the surfaces of the teeth that are adjacent the functional surfaces. This may be accomplished during preforming of the spur gear teeth particularly by forming a clearance, e.g., in the top and/or base region of each tooth to receive the material displaced during chipless finishing to the final dimensions. As a result, the amount of material that has to be displaced is minimized and, at the same time, bearing pressure occurs at the fewest possible points.

If the spur gear teeth and possibly also components adjacent thereto are quenched and tempered or case hardened, the functional surfaces of the spur gear teeth can settle, e.g., when the axial engaging force is applied and/or a torque is transmitted. Because the spur gear teeth are statically overdetermined, a minimum degree of settling of the functional surfaces during assembly or during use of the joint connection is necessary and desirable. To this end it is advantageous if the core of the components is comparatively soft to facilitate settling whereas the outer layers are hard and durable.

The object underlying the invention is furthermore achieved by a joint connection that is preferably produced in accordance with the above-described method.

To center the component and the constant velocity joint in relation to each other, the spur gear teeth must have at least a small wedge angle. Preferably this wedge angle is located in proximity of the self-locking mechanism. However, to minimize the axial forces occurring during torque transmission in the joint connection according to the invention, the wedge angle of the spur gear teeth is preferably selected between approximately 1° and approximately 15°, particularly between approximately 1.5° and approximately 5°.

As an alternative or in addition, a preferred embodiment of the invention provides for respective connection elements on the component and on the (constant velocity) joint for connection with a securing member such as a locknut, such that the locknut fixes the spur gear teeth intermeshingly under an axial engaging force or axial bias. To this end, the joint connection can have an inner hub, which is provided at one axial end with the spur gear teeth. The outer hub of the constant velocity joint can be connected in a known manner to a tubular shaft.

If the inner hub has a cylindrical section whose one end is provided with the spur gear teeth, the outer surface of this cylindrical section can have a connection element for fixing the locknut that is used to apply an axial engaging force. Similarly, the component being connected to the joint by the joint connection can also have a cylindrical section whose one end is provided with the spur gear teeth and whose outer surface has a connection element such as a thread for fixing the locknut. The locknut can be held, for example, by a securing ring, which engages in a groove in the outer circumference of one of the two cylindrical sections and behind a corresponding shoulder on the locknut, and can be screwed together with the other cylindrical section. This makes it possible to apply a defined axial engaging force to bring the two sets of spur gear teeth into engagement with each other.

According to yet another embodiment of the invention, the component and the inner hub of the constant velocity joint can each have a bore, with at least one of the two bores being provided with an internal thread, so that a defined axial engaging force can be applied by a threaded pin or a bolt that connects the component and the internal hub with each other. Particularly if the outer hub of the constant velocity joint is connected to a shaft it is preferred if the bolt is guided through a bore in the component and screwed into the inner hub.

The constant velocity joint is preferably an opposed path joint, especially a joint like the one disclosed in U.S. patent publication no. 2005/0153782 (=DE 102 09 933).

To enable the functional surfaces of the tooth faces to settle, it is preferred if the inner hub of the constant velocity joint is case hardened. In contrast, the component being connected to the constant velocity joint, or at least the section provided with the spur gear teeth, can be heat treated or tempered or also case hardened.

Further developments, advantages and potential applications of the invention also result from the following description of embodiments and from the drawings. All the described and/or illustrated features, either alone or in any combination, constitute the subject matter of the invention, regardless of how they are summarized in the claims or refer back to other claims.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
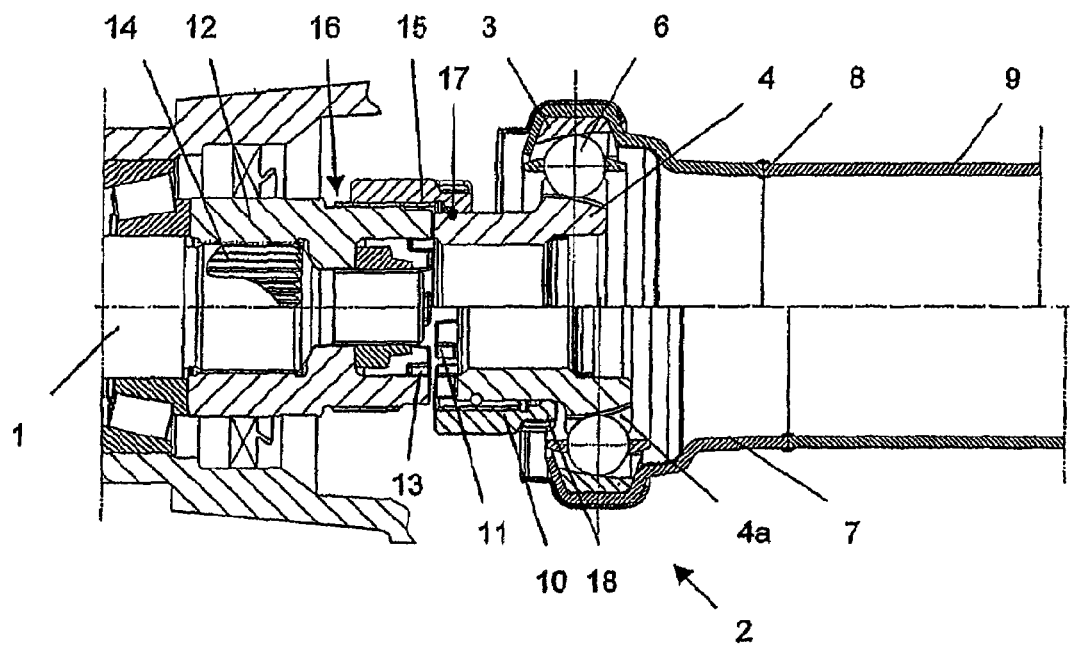
FIG. 1 is a schematic sectional view of a joint connection according to a first embodiment of the invention.
Figure 2:
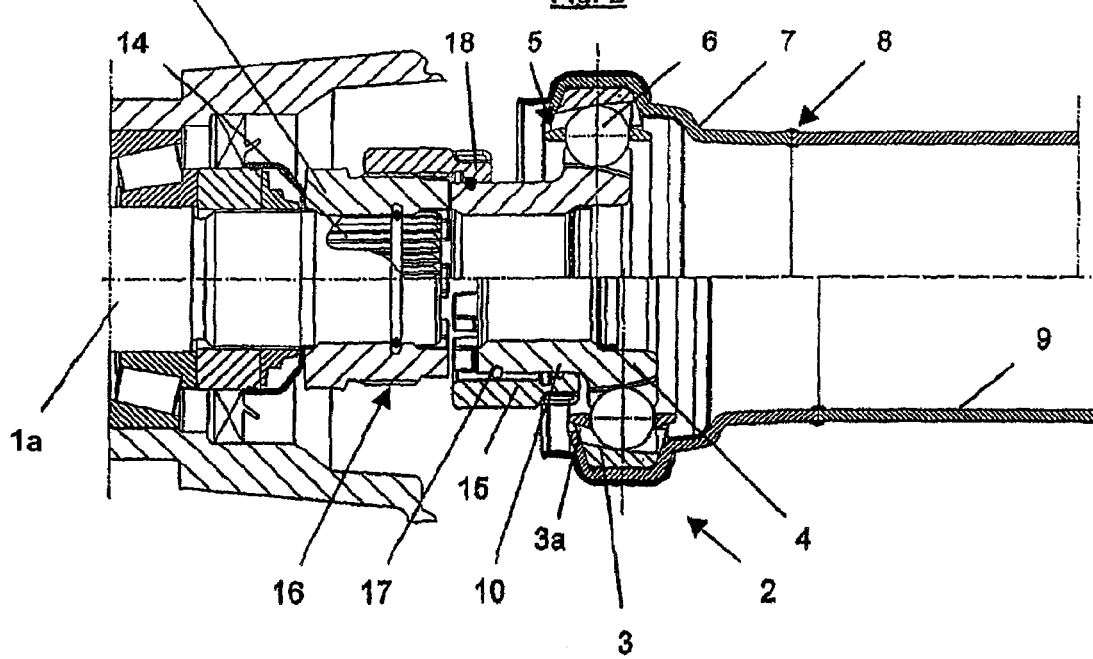
FIG. 2 is a schematic sectional view of a joint connection according to a second embodiment of the invention.
Figure 3:
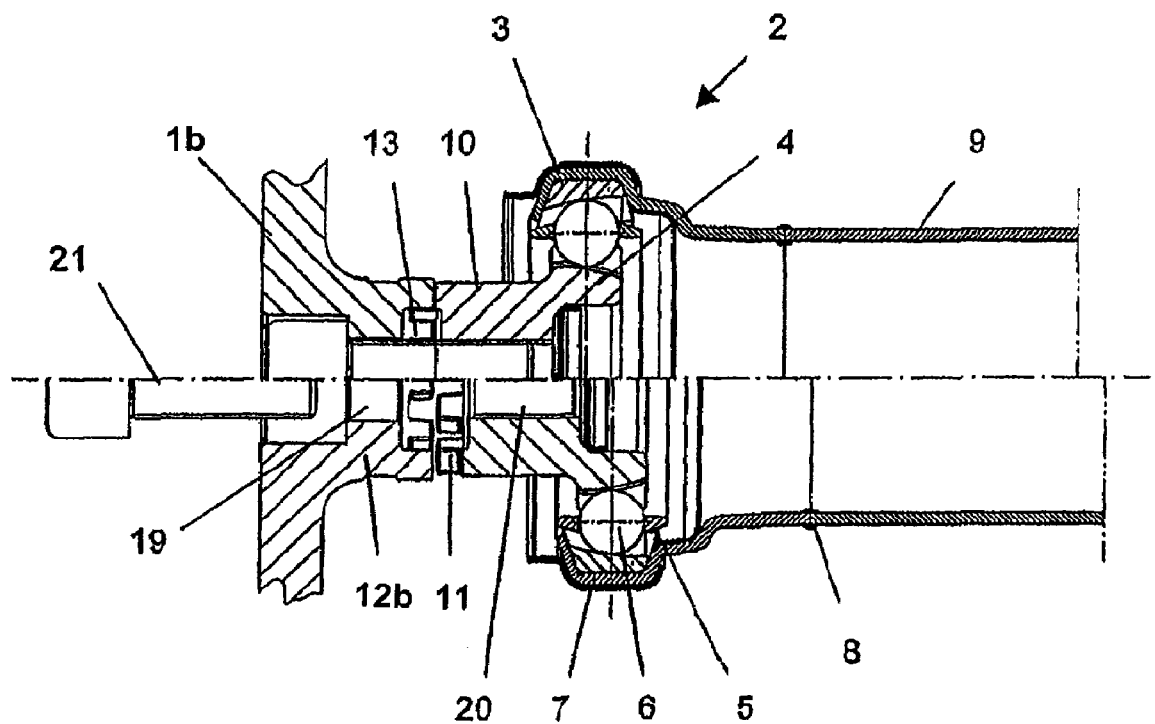
FIG. 3 is a schematic sectional view of a joint connection according to a third embodiment of the invention.

The joint connections depicted in FIGS. 1 to 3 each show in the upper half of the figure a constant velocity joint 2 that is coupled to a component 1, while in the lower half of the figure the component 1 is not yet coupled to the constant velocity joint 2. In each case, like components in FIGS. 1 to 3 are identified by the same reference numerals.

The constant velocity joint 2 in the embodiments shown is an opposed path joint like the one disclosed, for example, in published US patent application no. US 2005/0153782 (=DE 102 09 933).

The constant velocity joint 2 has an outer hub 3 with races 3a arranged on the inside of the outer hub 3, an inner hub 4 with inner races 4a arranged on the outside thereof, a cage 5 arranged between the inner hub 4 and the outer hub 3 and guided in the outer hub 3 as well as balls 6, which are guided in the races 3a and 4a. The outer hub 3 is enclosed by and non-rotatingly connected with sheet metal receiving part 7. The receiving part 7 is connected to a tubular shaft 9, e.g., by a welded joint 8.

The component 1 which is being connected to the constant velocity joint 2 can be any kind of component, e.g., a shaft, a wheel flange, another joint or the like. The inner hub 4 of the constant velocity joint 2 has a cylindrical section 10, which in the embodiment shown is a type of sleeve extending toward the component 1 and is provided with spur gear teeth 11 at its axial end facing the component 1.

Similarly, the component 1, 1a or 1b also has a cylindrical section 12, 12a or 12b, respectively, whose axial end facing the constant velocity joint 2 is provided with spur gear teeth 13. The spur gear teeth 11 and 13 are adapted to each other in such a way that they can intermesh as illustrated in the upper halves of FIGS. 1 to 3 in order to transmit a torque.

The cylindrical section 12b of the component 1b can be integrally formed with the component 1b, as shown in FIG. 3. Alternatively, the cylindrical section 12 or 12a can also be a separate element that is non-rotatably connectable to the component 1 or 1a, as shown in FIGS. 1 and 2. In the embodiments shown in FIGS. 1 and 2, the cylindrical section 12 or 12a is configured as a sleeve having a set of longitudinal teeth formed over at least a partial area of its inner surface, which is non-rotatably connectable to a corresponding set of longitudinal teeth 14 formed over a partial area on the outer surface of component 1 or 1a. As can be seen from the drawings, the embodiment of FIG. 1 differs from that of FIG. 2 in the configuration of the cylindrical sections 12 and 12a, respectively, and in the location of the longitudinal teeth 14.

The torque-transmitting connection between component 1, 1a or 1b and the inner hub 4 of the constant velocity joint 2 is achieved by bringing the two sets of spur gear teeth 11 and 13 into engagement under an axial engaging force. To this end, in the embodiments shown in FIGS. 1 and 2, a securing member is provided in the form of a locking nut 15 which has an internal thread that can be screwed onto an external thread 16 formed on the cylindrical section 12 or 12a.

A groove formed in the cylindrical section 10 of the inner hub 4 holds a securing ring 17, against which rests an inwardly projecting shoulder 18 on the side of the locknut 15 facing the constant velocity joint 2. By a defined tightening of the locknut 15, the cylindrical section 12 or 12a of the component 1 or 1a can thus be pulled axially toward the cylindrical section 10 of the inner hub 4, such that the two sets of spur gear teeth 11 and 13 engage each other in a torque transmitting manner.

In contrast, in the embodiment shown in FIG. 3, the component 1b is provided with a bore 19. In addition, a threaded bore 20 is formed in the inner hub 4 of the constant velocity joint 2. The component 1b and the inner hub 4 can therefore be screwed together by a threaded bolt 21 such that the gear teeth 11 and 13 interengage with each other in a torque-transmitting manner.

Figure 4:
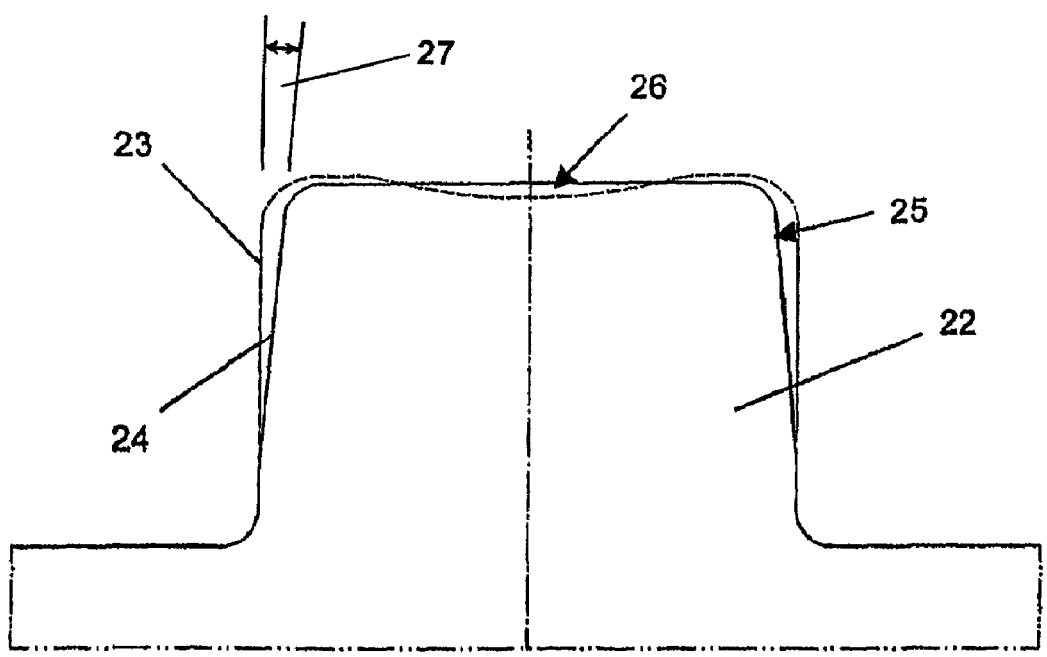
FIG. 4 is a schematic view of a tooth of a joint connection according to the invention in different manufacturing stages.

The manufacture of the spur gear teeth 11 and 13 will now be explained in greater detail with reference to FIG. 4. The sets of spur gear teeth 11 and 13 each comprise a plurality of teeth. FIG. 4 is a schematic illustration of a single tooth 22.

First, the teeth 22 of the spur gear teeth sets are pre-formed to give them for example the contour 23 indicated by the broken line in FIG. 4. Such pre-forming may be accomplished without chip removal, for example by hot forming. The teeth 22 are then finished chiplessly, i.e., by non-cutting techniques such as stamping, to their final dimensions so that they obtain the final contour 24 indicated by the solid line in FIG. 4 having wedge angle 27.

This chipless process step is preferably carried out in one or more stamping processes in such a way that displacement pressure is applied only to the functional surfaces 25 of the tooth, i.e., to the regions of the tooth flanks which in operation contact the tooth flanks of the corresponding spur gear teeth. Because only the functional surfaces 25 are subjected to the stamping process, there is no bearing pressure in this chipless process so that the functional surfaces 25 can be finished to their final dimensions with low force but high precision.

The contour 23 of the pre-formed tooth is selected to ensure a free flow of material during the stamping process along the surfaces adjoining the functional surfaces. To this end, e.g., a clearance 26 may be provided, into which the material displaced by deformation can flow. The clearance 26 shown in FIG. 4 is indicated only by way of example. Depending on the final contour 24 of the teeth 22, different clearances and/or a clearance arranged at a different location may prove to be advantageous.

If the teeth 11 and 13 are heat treated and tempered and/or case hardened, the functional surfaces 25 have the hardness required for torque transmission. The core of the teeth 22, however, is sufficiently soft so that the functional surfaces 25 can settle because of the axial engaging force applied by the locknut 15 or the threaded bolt 21 or because of the forces applied by torque transmission. Such settling is required in statically overdetermined gear teeth if all the teeth 22 are to transmit a torque as uniformly as possible.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A joint connection for connecting a component provided with axially facing spur gear teeth with a joint provided with corresponding axially facing spur gear teeth in a torque-transmitting manner, wherein:

said spur gear teeth on said component and on said joint have flanks that have a wedge angle in the range from about 10 to about 150 and that contact each other as functional surfaces;

said joint is a constant velocity joint having an inner hub comprising a cylindrical section, and the axially facing spur gear teeth of the joint are formed on an axial end face of the cylindrical section of the inner hub;

said component is provided with a sleeve having a cylindrical section and a set of longitudinal teeth formed on at least a partial area of an inner surface of said sleeve, said set of longitudinal teeth on said sleeve mating with a set of longitudinal teeth formed on at least a partial area of an outer surface of said component such that the sleeve is non-rotatably connected to said component, and the axially facing spur gear teeth of the component are formed on an axial end face of said cylindrical section of said sleeve;

said joint connection comprises a securing member which engages respective connection elements provided on the outer circumference of the cylindrical section of the sleeve and on the outer circumference of the cylindrical section of the inner hub of the joint and applies an axial engaging force to the sleeve and the joint to fix the flanks of the spur gear teeth on the sleeve in intermeshing, torque transmitting interengagement with the flanks of the spur gear teeth on the inner hub of the joint; and said securing member comprises a securing nut with a thread which mates with a thread on the component and a shoulder which projects inwardly on a side of said securing nut facing said joint and engages a securing ring received in a groove formed in said cylindrical section of said inner hub.

2. A joint connection according to claim 1, wherein the wedge angle of the functional surface flanks of the spur gear teeth is in the range from about 1.5° to about 5°.

3. A joint connection according to claim 1, wherein the joint is an opposed path constant velocity joint.

4. A joint connection according to claim 1, wherein the spur gear teeth are case hardened.

5. A joint connection according to claim 1, wherein the spur gear teeth are heat treated or tempered.

* * * * *